US010975931B2

(12) United States Patent
Yin et al.

(10) Patent No.: US 10,975,931 B2
(45) Date of Patent: Apr. 13, 2021

(54) FLEXPLATES AND METHOD FOR CAPACITOR DISCHARGE WELDING OF FLEXPLATES (71) Applicant: Magna International, Troy, MI (US)

(72) Inventors: Guobin Yin, Richmond Hills (CA);
Markus R. Schuiki, Eibiswald (AT);
Markus Reiterer, Gleisdorf (AT);
Alexander Dietrich, Sulztal (AT)

(73) Assignee: MAGNA INTERNATIONAL, Troy, MI (US)

( * ) Notice: Subject to any disclaimer, the term of this patent is extended or adjusted under 35 U.S.C. 154(b) by 90 days.

(21) Appl. No.: 15/988,091

(22) Filed: May 24, 2018

(65) Prior Publication Data
US 2018/0266517 A1 Sep. 20, 2018

Related U.S. Application Data (63) Continuation of application No. 14/102,886, filed on Dec. 11, 2013, now Pat. No. 9,982,748.
(Continued)

(51) Int. Cl.
*F16F 15/30* (2006.01)
*B23K 11/26* (2006.01)
(Continued)

(52) U.S. Cl.
CPC ............ *F16F 15/30* (2013.01); *B23K 11/26* (2013.01); *F16D 3/77* (2013.01); *F16F 15/1201* (2013.01);
(Continued)

(58) Field of Classification Search
CPC . F16D 1/076; F16D 3/77; F16D 1/068; F16D 1/027; F16D 3/06; F16H 55/17;
(Continued)

(56) References Cited

U.S. PATENT DOCUMENTS 2,913,925 A    11/1959    Smirl
4,020,937 A *    5/1977    Winter .................... F16D 13/71
                                                   192/107 R
(Continued)

FOREIGN PATENT DOCUMENTS

CA         2285837 C      8/2007
CN         1623048 A      6/2005
(Continued)

OTHER PUBLICATIONS

EPO Global Dossier Translation of First Office Action of the State Intellectual Property of People's Republic of China regarding Chinese Application No. 201380064587.6 of Magna Power Train of America, Inc., Apr. 29, 2016 (Year: 2016).*
(Continued)

*Primary Examiner* — Vinh Luong
(74) *Attorney, Agent, or Firm* — Dickinson Wright PLLC (57) ABSTRACT

A two-piece flexplate assembly having a ring gear welded to a central plate using a capacitor discharge welding process. The weld is established between a joining structure defined between the ring gear and the central plate using either an overlap arrangement, a projection arrangement, or a chamfer arrangement.

6 Claims, 9 Drawing Sheets

Related U.S. Application Data (60) Provisional application No. 61/736,283, filed on Dec. 12, 2012.

(51) Int. Cl.
*F16F 15/12* (2006.01)
*F16D 3/77* (2006.01)
*F16D 1/068* (2006.01)

(52) U.S. Cl.
CPC ...... *F16D 1/068* (2013.01); *F16D 2250/0076* (2013.01); *Y10T 74/1987* (2015.01)

(58) Field of Classification Search
CPC ......... B23K 26/32; B23K 11/26; F16F 15/30; Y10T 74/1987
See application file for complete search history.

(56) References Cited

U.S. PATENT DOCUMENTS

| | | | |
|---|---|---|---|
| 5,194,044 A | 3/1993 | Jackel et al. | |
| 5,226,756 A | 7/1993 | Takahashi et al. | |
| 5,323,665 A | 6/1994 | Rediker, Jr. | |
| 5,794,750 A | 8/1998 | Jackel | |
| 5,909,789 A | 6/1999 | Ilzig et al. | |
| 6,352,384 B1 * | 3/2002 | Frisch | F16H 41/24 403/1 |
| 6,394,243 B1 | 5/2002 | Sasse | |
| 6,505,723 B1 | 1/2003 | Annear | |
| 6,547,052 B1 | 4/2003 | Schwuger | |
| 6,782,773 B1 * | 8/2004 | Jacquemont | F02N 15/04 464/89 |
| 7,134,537 B2 * | 11/2006 | Schwuger | F16D 23/025 192/53.34 |
| 7,481,050 B2 | 1/2009 | Maienschein et al. | |
| 7,717,247 B2 | 5/2010 | Stockl et al. | |
| 8,286,776 B2 | 10/2012 | Doernhoefer et al. | |
| 8,287,390 B2 | 10/2012 | Reinhart | |
| 8,439,764 B2 | 5/2013 | Avins | |
| 8,590,683 B2 | 11/2013 | Tsukamoto et al. | |
| 8,596,164 B2 | 12/2013 | Reid | |
| 10,060,503 B2 * | 8/2018 | Kowalski | F16D 3/72 |
| 2002/0134632 A1 | 9/2002 | Arhab et al. | |
| 2002/0169050 A1 * | 11/2002 | Gehring | F16D 1/068 475/331 |
| 2007/0074943 A1 | 4/2007 | Hemphill et al. | |
| 2007/0253823 A1 | 11/2007 | Parks et al. | |
| 2007/0277643 A1 | 12/2007 | King et al. | |
| 2007/0277644 A1 | 12/2007 | King | |
| 2008/0053773 A1 | 3/2008 | Uhler et al. | |
| 2008/0149450 A1 | 6/2008 | Christoffer et al. | |
| 2010/0018824 A1 | 1/2010 | McCrary et al. | |
| 2012/0297910 A1 | 11/2012 | Iwata et al. | |
| 2013/0195545 A1 * | 8/2013 | Tsuchida | F16H 55/17 403/270 |
| 2013/0270233 A1 | 10/2013 | Gu et al. | |
| 2015/0122066 A1 | 5/2015 | McCombs | |
| 2015/0330449 A1 | 11/2015 | Ribault | |
| 2016/0229009 A1 * | 8/2016 | Klein-Hitpass | F16H 48/00 |
| 2020/0016688 A1 * | 1/2020 | Wilson | F16H 55/06 |

FOREIGN PATENT DOCUMENTS

| | | |
|---|---|---|
| CN | 201401479 Y | 2/2010 |
| DE | 3745195 C2 | 11/2001 |
| DE | 10203019 A1 | 8/2003 |
| DE | 102007001790 B3 | 2/2008 |
| DE | 102013009209 A1 | 3/2014 |
| EP | 1673544 A1 | 6/2006 |
| EP | 1967763 A1 * | 9/2008 |
| EP | 2803439 A1 | 11/2014 |
| FR | 2813029 A1 | 2/2002 |
| WO | WO2009105401 A1 | 8/2009 |
| WO | WO2009143958 A1 | 12/2009 |
| WO | WO2011151932 A1 | 12/2011 |
| WO | WO 2011151932 A1 * | 12/2011 |
| WO | WO2012079163 A1 | 6/2012 |
| WO | WO 2012079163 A1 * | 6/2012 |
| WO | WO2015078454 A1 | 6/2015 |

OTHER PUBLICATIONS

EPO Global Dossier Translation of Second Office Action of the State Intellectual Property of People's Republic of China regarding Chinese Application No. 201380064587.6 of Magna Power Train of America, Inc., Dec. 19, 2016 (Year: 2016).*
Derwent Abstract of EP001967763A1, Tobias, Sep. 10, 2008 (Year: 2008).*
English Abstract of FR 2813029, Le Doare, Feb. 2002.
English Abstract of WO 20111151932A1, Nakamura et al., Dec. 2011.
Define flange—Google Search, google.com, Feb. 7, 2016.
Define flange images—Google Search, google.com, Feb. 7, 2016.
English Abstract of DE 102013009209 A1, Behr et al., Mar. 2014.
English Abstract of DE 102007001790 B3, Kniat, Feb. 2008.
International Search Report dated Apr. 29, 2014 (PCT/US2013/074605).
Office Action dated Jun. 4, 2019 in corresponding German Application No. 11 2013 005 927.4.

* cited by examiner

FLEXPLATES AND METHOD FOR CAPACITOR DISCHARGE WELDING OF FLEXPLATES

CROSS-REFERENCE TO RELATED APPLICATIONS

This application is a continuation of U.S. patent application Ser. No. 14/102,886 filed Dec. 11, 2013, which claims the benefit priority of U.S. Provisional Application No. 61/736,283 which was filed on Dec. 12, 2012. The entire disclosures of each of the above-noted patent applications is incorporated herein by reference.

FIELD

The present disclosure relates generally to two-piece flexplate assemblies for use in motor vehicles and, more particularly, to two-piece flexplate assemblies having a ring gear welded to a central plate using a capacitor discharge welding process.

BACKGROUND

This section provides background information related to the present disclosure which is not necessarily prior art.

Flexplates, also commonly referred to as flywheels, are used in vehicular drivetrain applications to provide a mechanical coupling between an output component of an internal combustion engine and an input component of a transmission. More specifically, one side of the flexplate is secured to an engine crankshaft while the other side of the flexplate is secured to a torque converter. Consequently, the flexplate transmits engine torque to the torque converter which, in turn, transmits engine torque to the transmission.

As is widely known, the flexplate is configured to deflect axially a limited amount based on changes in engine speed, to accommodate movement and/or vibration of the crankshaft, and in response to fluid pressure variations inside the torque converter. Additionally, the flexplate serves as an engagement mechanism for the pinion gear of an electric starter motor. When the electric starter motor receives an electrical current in response to an ignition signal from the vehicle, the pinion gear engages and drives a ring gear portion of the flexplate, thereby causing the flexplate to rotatably drive the engine crankshaft. Upon the engine being successfully started, the pinion gear is disengaged while the flexplate continues to be rotatably driven by the crankshaft.

In many instances, the flexplate is a two-piece flexplate assembly comprised of a central plate and a ring gear rigidly secured to an outer rim portion of the central plate. The central plate is generally made (i.e., stamped) of a constant thickness material, although variable thickness materials can also be used. The central plate typically includes a generally flat outer portion and a slightly dished or canted central portion. The central portion includes a center aperture adapted to receive a crankshaft hub and a plurality of mounting apertures for aligning and mounting the flexplate to the crankshaft. The degree of dishing is optional and depends primarily upon the space available between the crankshaft and the torque converter. Likewise, a plurality of mounting apertures extend through the outer portion of the center plate for mounting the flexplate assembly to the torque converter.

Various methods have been employed to rigidly secure the ring gear to the central plate of conventional two-piece flexplate assemblies. For example, U.S. Publication No. US 2007/0277643 describes a two-piece flexplate assembly wherein an adhesive is used to rigidly secure the ring gear to the central plate. Additionally, U.S. Publication No. US 2007/0277644 discloses a two-piece flexplate assembly wherein the ring gear is press-fit and welded to the central plate using a gas metal arc welding (GMAW) process, commonly referred to as MIG and MAG welding. It is also known to laser weld the ring gear to the central plate.

Currently, the use of GMAW and laser welding processes are sufficient and acceptable for use in the manufacture of two-piece flexplate assemblies. However, each has certain disadvantages. Specifically, while GMAW welding is reasonably fast and inexpensive, its use may result in hardness reduction of the ring gear teeth, potential part distortion and high residual stress due to the high heat requirements. Likewise, while laser welding is a more advanced and precise process, it is inherently more expensive and complicated.

The use of these welding processes is further limited in those flexplate assemblies using a nitrided central plate. Nitrided central plates are commonly used because they permit reduce component weight as well as improve the yield and tensile strength of the central plate. However, it is difficult to consistently form a good weld between one or more nitrided parts because the weld zone can be very porous due to the release of nitrogen gas into the weld pool as the nitride layer decomposes during the welding process. Specifically, due to fast solidification of the weld pool, the nitrogen gas can become trapped and, as a result, form porous bubbles in the weld zone. To avoid this undesirable weld porosity issue, current solutions include removing the nitrided layer prior to welding and/or masking the weld surface during nitriding to establish a naked weld surface. Unfortunately, these solutions are not always commercially practical because they add extra process steps and costs to the overall production of two-piece flexplate assemblies.

Thus a need exists to develop alternative methods of welding two-piece flexplate assemblies which address and overcome these disadvantages.

SUMMARY

This section provides a general summary of the disclosure, and is not a comprehensive disclosure of its full scope or all of its features.

In accordance with one aspect of the present disclosure, a two-piece flexplate assembly for use in the powertrain of a motor vehicle includes a ring gear that is welded to an outer portion of a central plate using a capacitor discharge (CD) welding process.

In accordance with a related aspect of the present disclosure, the central plate of the two-piece flexplate assembly is nitrided prior to being CD welded to the ring gear. During the CD welding process, a high pressured electrical current travels through the weld area for melting the materials while simultaneously a large clamping force is applied to the ring gear and the central plate to join the molten materials. The combination of high pressure current and large clamping force acts to immediately expel or drive out the nitrogen gas, or any other gases, from the weld zone as soon as the gases are formed.

In accordance with these and other aspects, features and advantages of the present disclosure, a two-piece flexplate assembly can be CD welded using an overlapping joining structure between the ring gear and the central plate. In a first exemplary embodiment, a first overlapping joining structure is established by the central plate having a larger diameter than the inner diameter of the ring gear so as to define a continuous overlap therebetween. In a second exemplary embodiment, a second overlapping joining structure is established by the ring gear having a stepped shoulder formed in its inner diameter against which an outer peripheral portion of the central plate is engaged to define a continuous overlap therebetween. In a third exemplary embodiment, a third overlapping joining structure is established by the ring gear having a stepped shoulder formed in its inner diameter against which a plurality of outwardly extending projections formed on the outer periphery of the central plate engage to define a non-continuous overlap arrangement.

In accordance with further alternative embodiments, a two-piece flexplate assembly utilizing a projection type joining structure between the ring gear and the central plate is disclosed. In one exemplary embodiment, the central plate is formed to include a plurality of transverse projections protruding from one face surface and a corresponding plurality of depressions extending into the other face surface. The projections rest on and engage a ring portion of the ring gear prior to CD welding to define a "plate projection" arrangement. In a second exemplary embodiment, the ring gear is machined to form a contoured projection around its inner diameter such that the outer peripheral portion of central plate engages the tip of the contoured projection prior to CD welding to define a "ring gear projection" arrangement.

In accordance with yet another alternative embodiment, a two-piece flexplate assembly utilizes a ring gear machined to include a chamfer on its inner diameter surface against which an outer edge portion of the central plate rests prior to CD welding to define a "chamfer type" contact arrangement.

Further areas of applicability will become apparent from the description provided hereon. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the drawings, wherein like reference numbers indicate like or corresponding components throughout the several views, a two-piece flexplate assembly is generally shown at 10. Flexplate assembly 10 is constructed and manufactured according to the teachings of the subject invention and is adapted to be disposed between and provided for driveably connecting an output component of an internal combustion engine (not shown) to an input component of a transmission (not shown) in a motor vehicle. More specifically, flexplate assembly 10 is adapted to be mounted to a hub portion of an engine crankshaft via a plurality of first mounting bolts. Flexplate assembly 10 is further adapted to be mounted to the torque converter via a plurality of second mounting bolts. As is conventional, rotation of the crankshaft causes flexplate assembly 10 to rotate which, in turn, causes the torque converter to be rotated in concert with the crankshaft. An electric starter motor is typically used to rotatably drive flexplate assembly 10 during an ignition cycle of the motor vehicle to drive the engine crankshaft.

Figure 1:
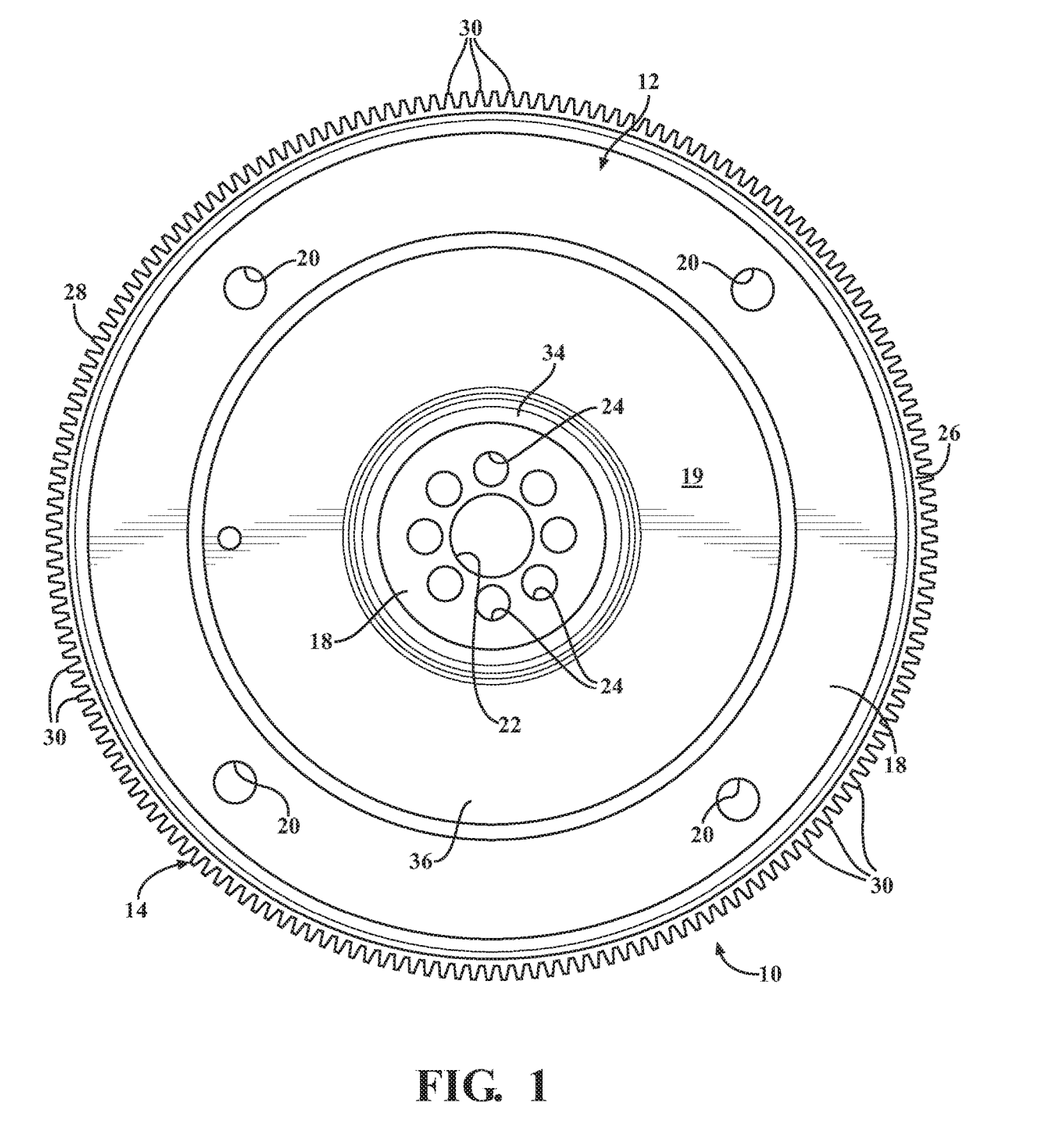
FIG. 1 is a plan view illustrating an exemplary two-piece flexplate assembly.
Figure 2:
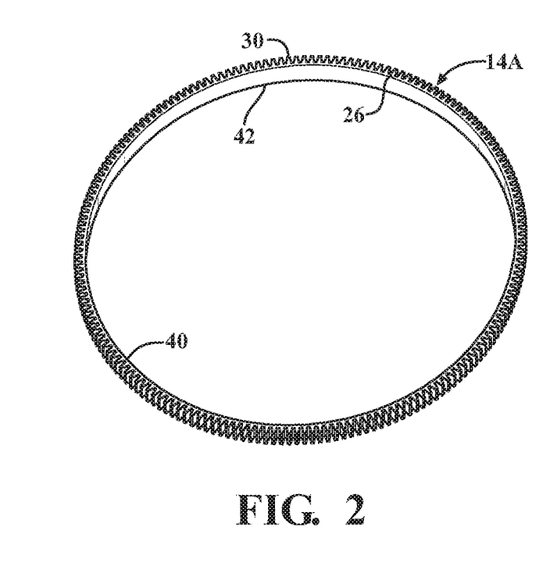
FIGS. 2-4 illustrate a two-piece flexplate assembly manufactured using a capacity discharge ("CD") welding process to weld a first overlapping joining structure established between the ring gear and the central plate.
Figure 3:
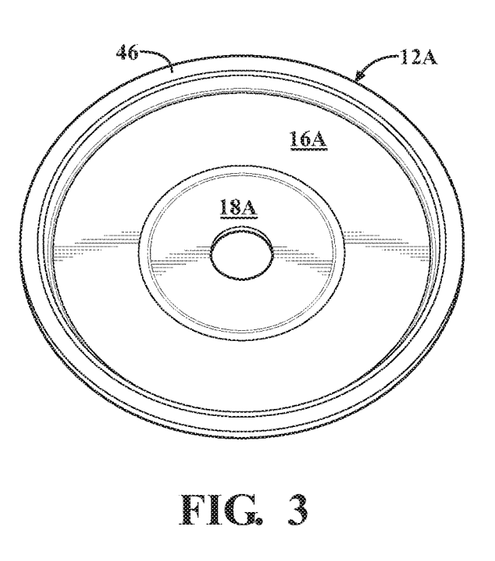

Referring initially to FIG. 1, an exemplary non-limiting structure for flexplate assembly 10 is shown to generally include a central plate 12 and a ring gear 14 secured thereto. Central plate 12 is a unitary stamping having an outer portion 16, an inner portion 18 and an intermediate portion 19 therebetween. As will be appreciated, central plate 12 is rotatably stiff yet axially flexible such that it can resiliently flex to a limited extent to help absorb and transmit forces exerted upon it during operation of the vehicle's powertrain.

Outer portion 16 of central plate 12 includes a plurality of mounting apertures 20 for receiving the second mounting bolts used to secure the torque converter to flexplate assembly 10. Inner portion 18 of central plate 12 includes a central aperture 22 for aligning and mounting flexplate assembly 10 to the crankshaft. A plurality of mounting apertures 24 are formed in inner portion 18 of central plate 12 and arranged to receive the first mounting bolts used to secure flexplate assembly 10 to the hub of the crankshaft. Intermediate portion 19 can be stepped or "canted" relative to outer portion 16 and/or inner portion 18 to accommodate resilient flexure of central plate 12 during driven rotation of the crankshaft.

Ring gear 14 is shown to include a rim portion 26 having an outer circumference 28. A plurality of gear teeth 30 are formed in outer circumference 28 of ring gear 14. The number and size of gear teeth 30 will vary with the type of engine, size of flexplate assembly 10, and the type of pinion gear used with the starter motor. While not limited thereto, intermediate portion 19 of central plate 12 may include stepped sections 34 and 36 relative to planar outer portion 16 and planar inner portion 18. The central plate is made from any suitable material such as, for example, S.A.E. J1392 that has been coated with a nitride layer via a conventional nitriding process. Ring gear 14 may be made from any suitable material such as, for example, S.A.E. 1038 to 1055 steel with carbon, heat-treated to a Rockwell hardness of between 40 and 50.

Figure 4:
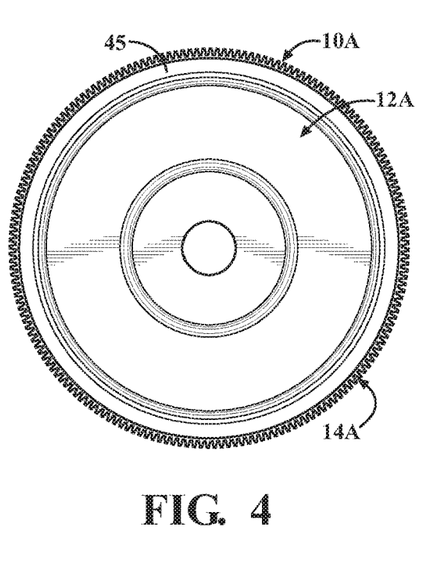
Figure 5:
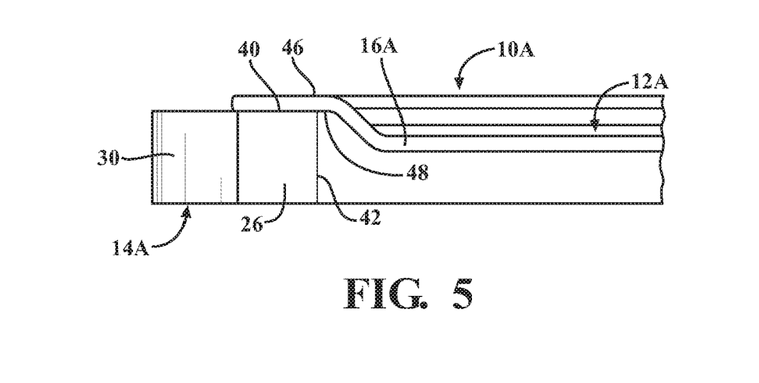
FIG. 5 is a partial sectional view of FIG. 4 illustrating the first overlapping joining structure in greater detail.
Figure 6:
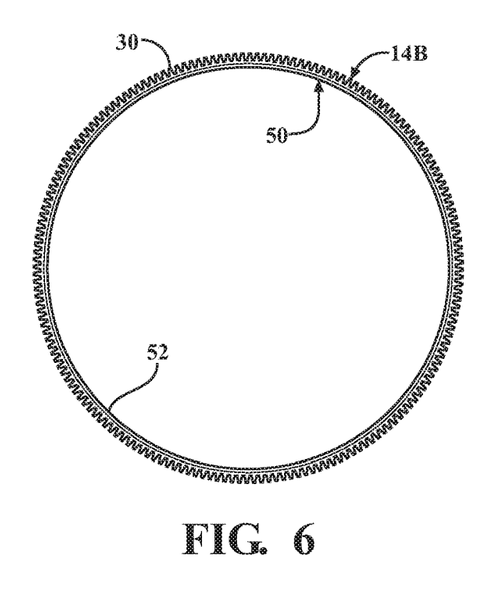
FIGS. 6-8 illustrate a two-piece flexplate assembly manufactured using a CD welding process to weld a second overlapping joining structure established between the ring gear and the central plate.
Figure 7:
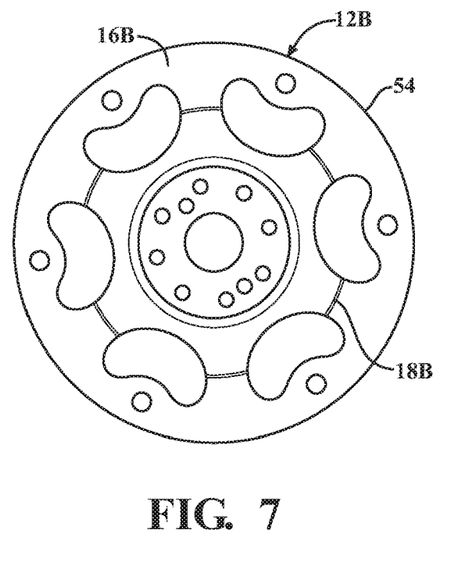

Referring now to FIGS. 2 through 5, a construction for a flexplate assembly 10A having a basic or first overlapping joint structure between a ring gear 14A and a central plate 12A for use in association with a capacitor discharge ("CD") welding process will now be described. Ring gear 14A includes a rim portion 26 defining a planar face surface 40 and an inner diameter surface 42. Central plate 12A includes a stepped or raised flange portion 46 associated with outer portion 16A and which has a planar face surface 48. Planar face surface 48 of central plate 12A overlaps and engages planar surface 40 of ring gear 14A. FIG. 4 best illustrates that flange portion 46 of central plate 12A defines a continuous annular overlap joining configuration with respect to rim portion 26 of ring gear 14A. Accordingly, when the CD welding process (to be described hereinafter) is used in association with this first overlapping joint structure, a continuous weld seam will be established between the material associated with nitride flange portion 46 of central plate 12A and the material associated with rim portion 26 of ring gear 14A.

Figure 8:
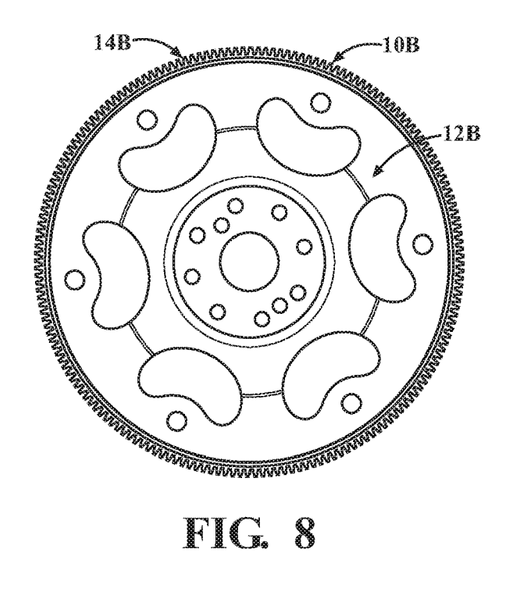
Figure 9:
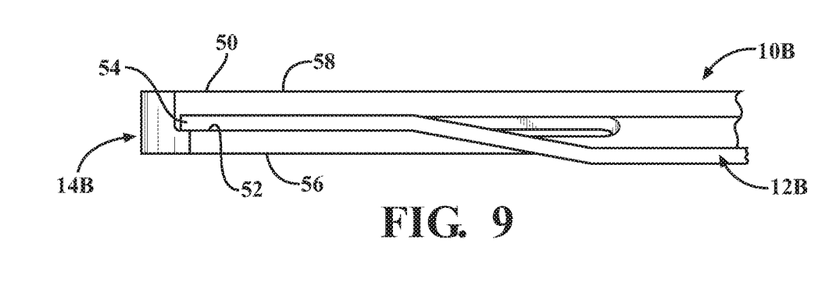
FIG. 9 is a partial sectional view of FIG. 8 illustrating the second overlapping joining structure in greater detail.

Referring now to FIGS. 6 through 9, a construction for a flexplate assembly 10B having a machined or second overlapping joint structure between a ring gear 14B and a central plate 12B for use in association with the CD welding process will now be described. Ring gear 14B includes a stepped rim portion 50 defining a continuous shoulder flange surface 52. Central plate 12B includes a planar outer portion 16B defining a peripheral edge surface 54 and a planar face surface 56. FIGS. 8 and 9 best illustrate that face surface 56 of central plate 12B rests on shoulder flange surface 52 of ring gear 14B while edge surface 54 is located in close proximity to an inner wall surface 58 of stepped rim portion 50. Preferably, ring gear 14B is machined to define inner wall surface 58 and shoulder flange surface 52. Accordingly, when the CD welding process is used in association with this second overlapping joint structure, a continuous weld seam will be established between the material associated with stepped rim portion 50 of ring gear 14B and the material associated with central plate 12B resting thereon.

Figures 10, 11, 12, 13:
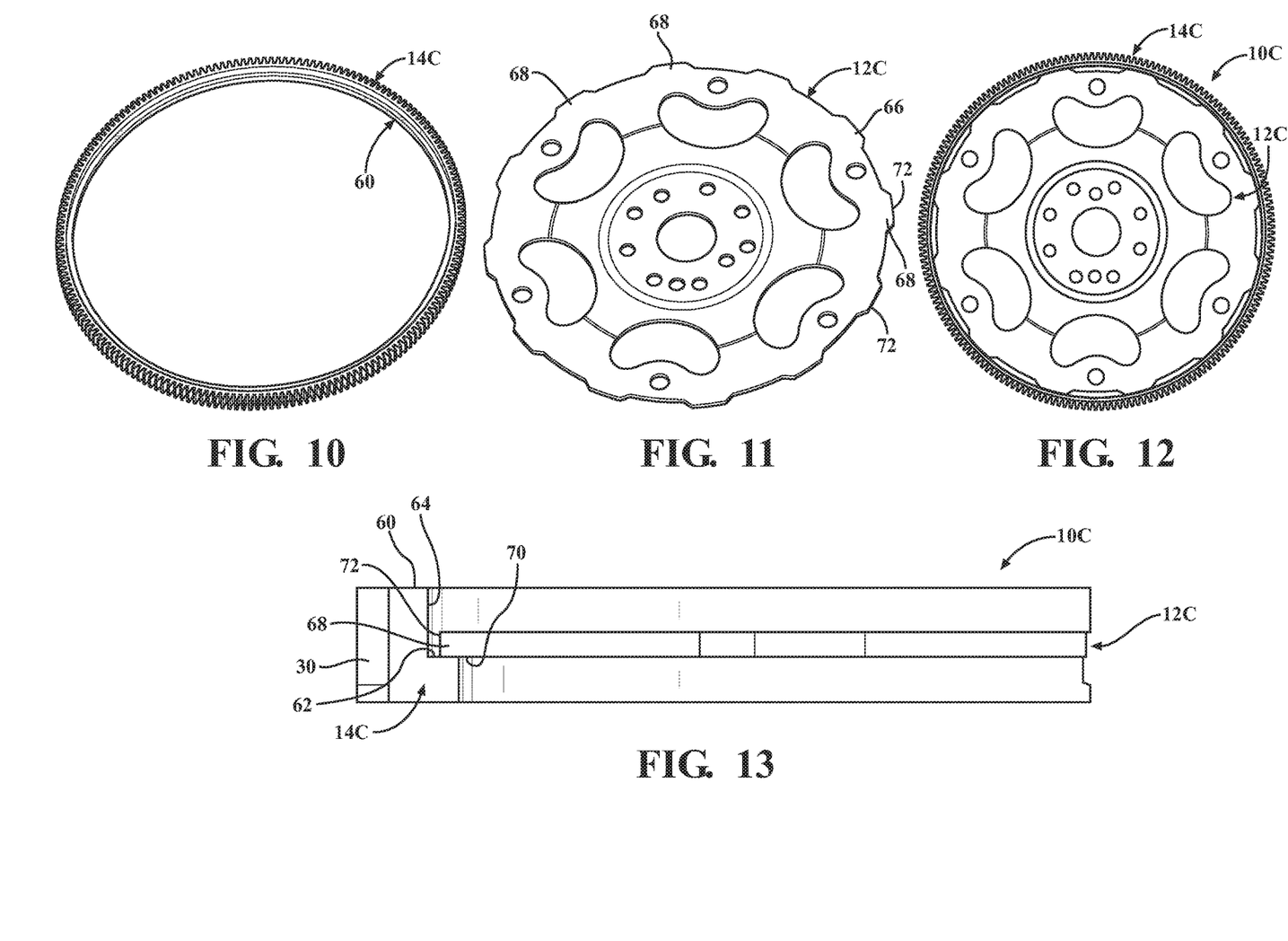
FIGS. 10-12A illustrate a two-piece flexplate assembly manufactured using a CD welding process to weld a third overlapping joining structure established between the ring gear and the central plate.
FIG. 13 is a partial sectional view of FIG. 12 illustrating the third overlapping joining structure in greater detail.
Figure 12A:
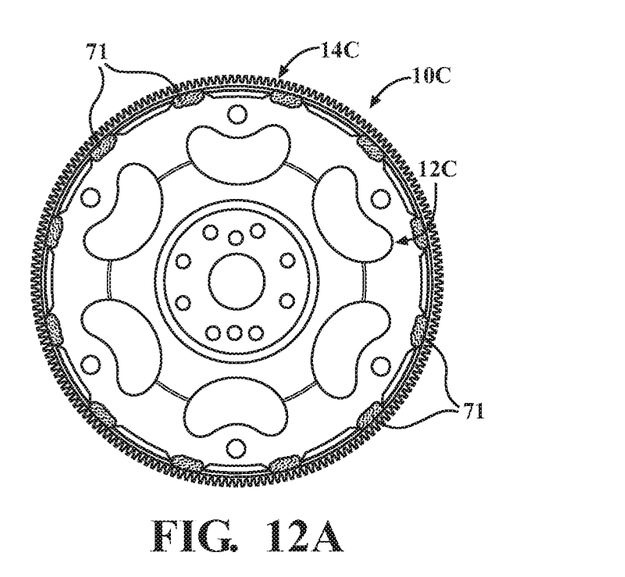

Referring now to FIGS. 10 through 13, a construction for a flexplate assembly 10C having a non-continuous or third overlapping joining structure between a ring gear 14C and a central plate 12C for use with the CD welding process will now be described. Ring gear 14C is configured similar to ring gear 14B and includes a stepped rim portion 60 defining a continuous shoulder flange surface 62 and an inner wall surface 64. An edge portion 66 of central plate 12C is configured to be cut-out so as to define a plurality of radially outwardly-extending projection tabs 68. FIGS. 12 and 13 illustrate that a planar face surface 70 of each tab 68 rests on shoulder flange surface 62 while an edge surface 72 of each tab 68 is located in close proximity to inner wall surface 64. Accordingly, when the CD welding process is used in association with this third overlapping joint structure, a non-continuous weld seam 71 is established along the periphery. Specifically, since the weld seam 71 is only established between the material associated with the projecting tabs 68 on central plate 12C and the material associated with shoulder flange surface 62 and inner wall surface 64 of ring gear 14C that are overlapped by tabs 68, a series of distinct and spaced weld joints are established.

Figure 14:
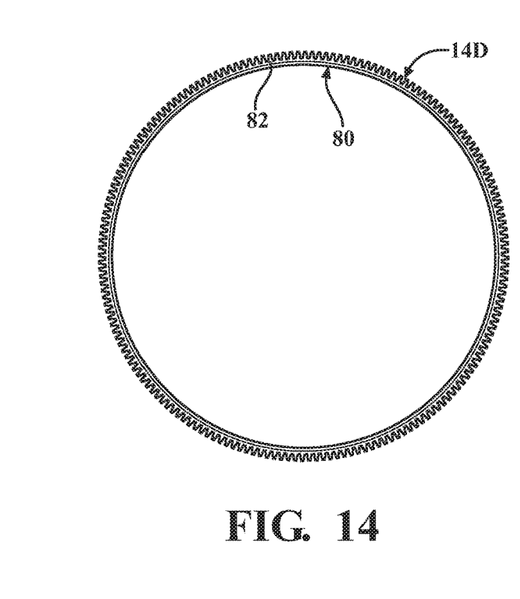
FIGS. 14-16 illustrate a two-piece flexplate assembly manufactured using a CD welding process to weld a first projection type joining structure established between the ring gear and the central plate.
Figure 15:
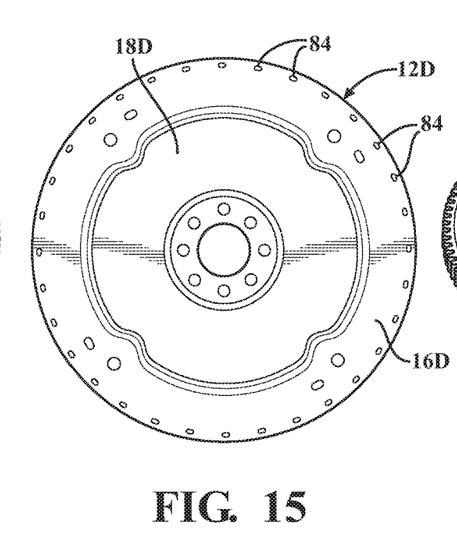
Figure 16:
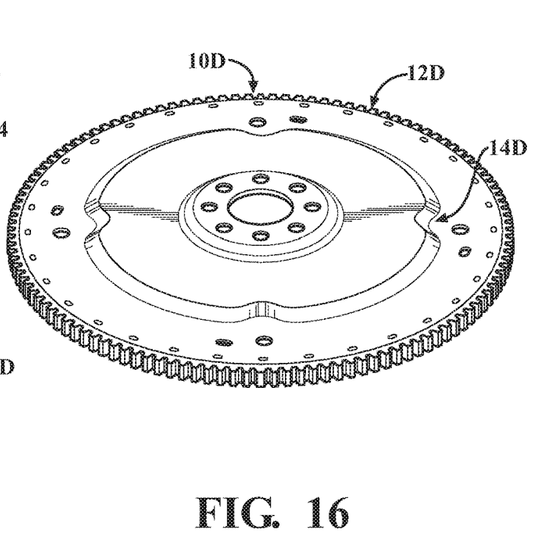
Figure 17:
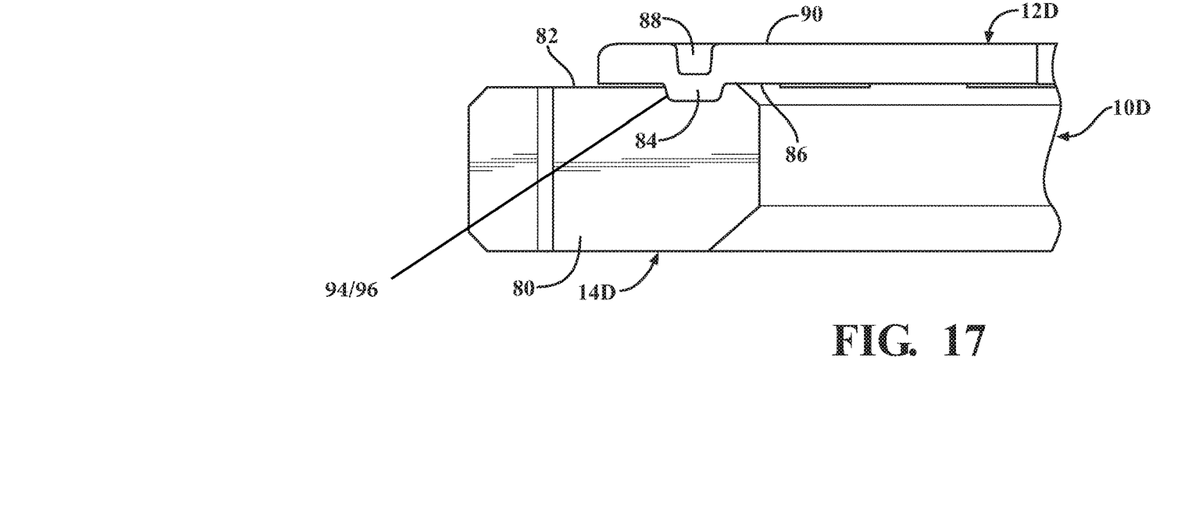
FIG. 17 is a partial sectional view of FIG. 16 illustrating the first projection type joining structure in greater detail.
Figure 18:
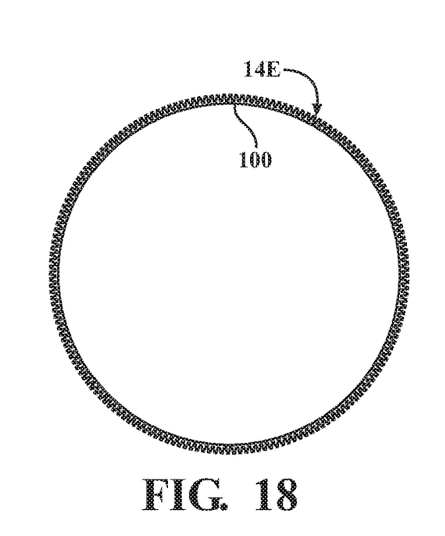
FIGS. 18-20 illustrate a two-piece flexplate assembly manufactured using a CD welding process to weld a second projection type joining structure established between the ring gear and the central plate.

Referring now to FIGS. 14 through 17, a construction for a flexplate assembly 10D having a "plate" type or first projection joining structure between a ring gear 14D and a central plate 12D for use with the CD weld process will now be described. FIG. 14 shows ring gear 14D to include a rim section 80 defining a planar face surface 82. FIG. 15 shows central plate 12D to include a series of circumferentially-arranged projections 84 extending outwardly from a planar surface 86 of outer portion 16D. A series of corresponding depressions 88 extend inwardly from an opposite planar surface 90 of outer portion 16D. Projections 84 and depressions 88 are concurrently produced via a stamping operation. FIGS. 16 and 17 illustrate projections 84 resting on or engaging planar surface 82 of rim section 80. Accordingly, when the CD welding process is used in association with this first projection type joining structure, the material associated with projections 84 on central plate 12D and the material associated with planar surface 82 engaging projections 84 establish a plurality on weld areas. This use of a plurality of circumferentially-arranged distinct weld spots permits a higher power density weld compared to a continuous weld. As an option, a series of detent chambers 94 can be formed in planar surface 84 of ring gear 14D which are sized and positioned to accept receipt of projections 84 on central plate 12D therein. Chambers 94 can be machined into ring gear 14D. As a further option, a continuous detent groove 96 can be formed in planar surface 82 of ring gear 14D which is likewise sized to accept receipt of projections 84 thereon.

Figure 19:
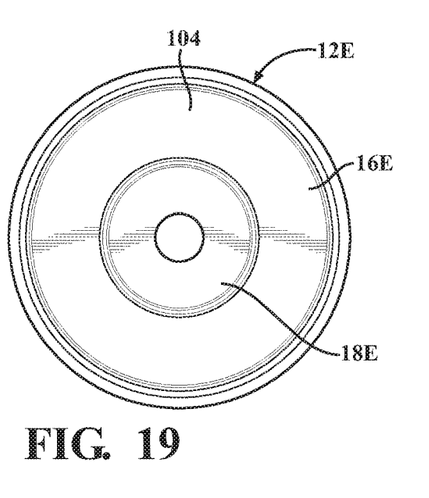
Figure 20:
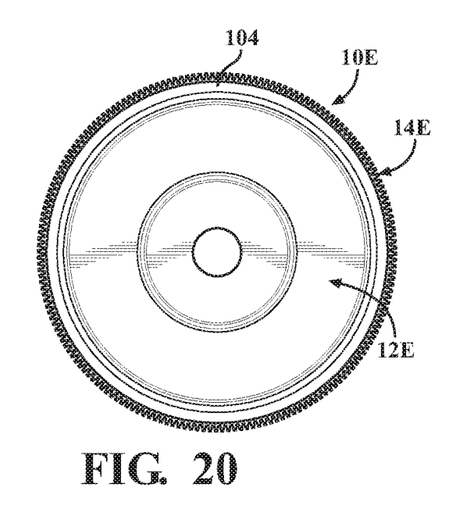
Figure 21:
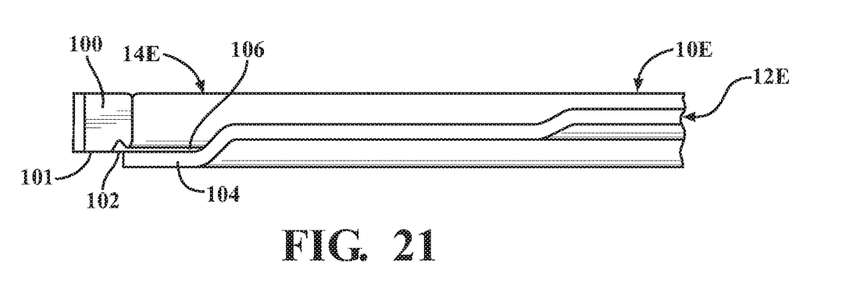
FIG. 21 is a partial sectional view of FIG. 20 illustrating the second projection type joining structure in greater detail.

Referring now to FIGS. 18 through 21, a construction for a flexplate assembly 10E having a "ring gear" type or second projection joining structure between a ring gear 14E and a central plate 12E for use in association with the CD welding process will now be described. Ring gear 14E is machined to define a rim portion 100 having a continuous shaped (i.e., triangular-shaped) projection 102 extending around its inner diameter. FIG. 19 shows central plate 12E having an annular flange 104 formed at its outer peripheral area which defines a planar face surface 106. FIGS. 20 and 21 illustrate planar face surface 106 resting on or engaging a tip portion of the triangular-shaped projection 102. Accordingly, when the CD welding process is used in association with this second projection type joining structure, the material associated with projection 102 on ring gear 14E is welded to the material associated with the flange 104 on central plate 12E in contact with projection 102. Projection 102 may be defined by machining a continuous slotted groove into a planar surface 101 of ring gear 14E.

Figure 22:
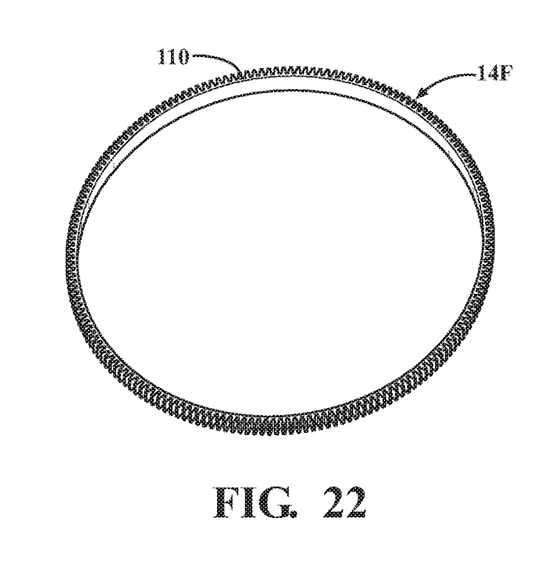
FIGS. 22-24 illustrate a two-piece flexplate assembly using a CD welding process to interconnect a chamfer type joining structure between the ring gear and the central plate.
Figure 23:
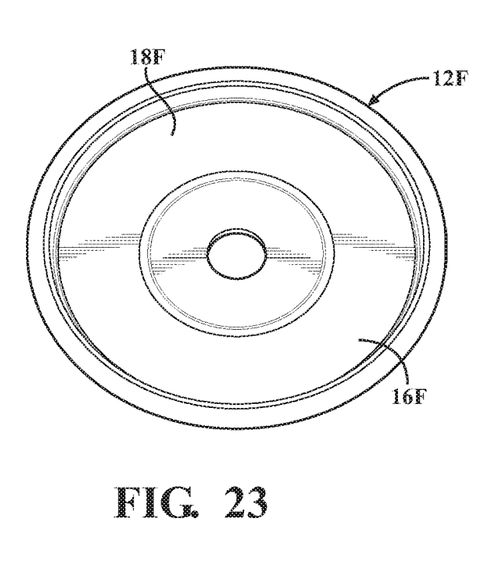
Figure 24:
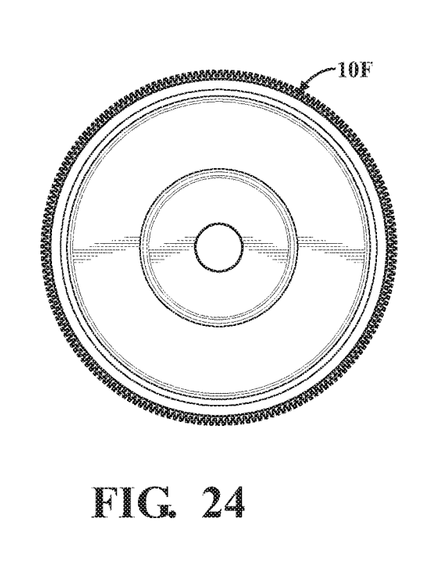
Figure 25:
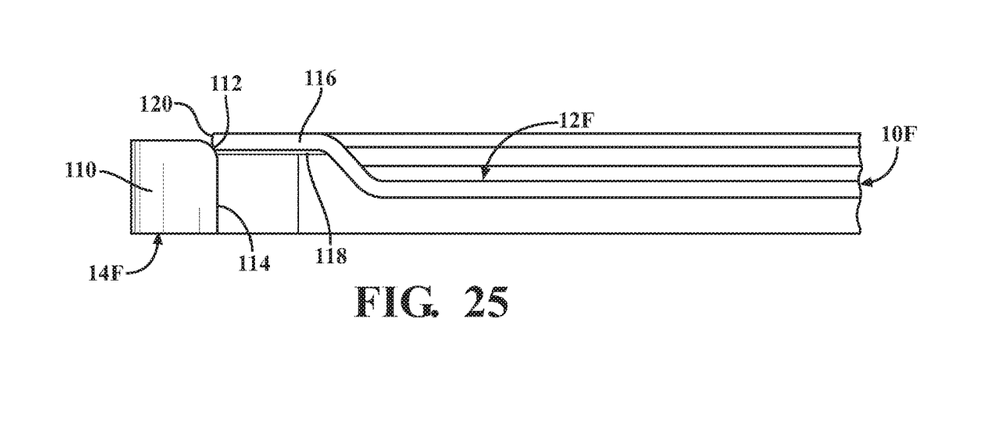
FIG. 25 is a partial sectional view of FIG. 24 illustrating the chamfer type joining structure in greater detail.

Referring now to FIGS. 22 through 25, a construction for a flexplate assembly 10F having a "continuous chamfer" type joining structure between a ring gear 14F and a central plate 12F for use with the CD welding process will now be described. FIG. 22 shows ring gear 14F to include a rim portion 110 having a chamfered edge 112 adjacent its inner diameter wall surface 114. FIG. 23 shows central plate 12F having a continuous flange portion 116 associated with its outer portion 16F and having a planar face surface 118 and an edge surface 120. FIGS. 24 and 25 illustrate edge surface 120 of flange portion 116 on central plate 12F engaging chamfered edge 112 of rim portion 110 on ring gear 14F. Accordingly, a continuous weld seam is established upon CD welding of ring gear 14F to central plate 12F.

Figure 26:
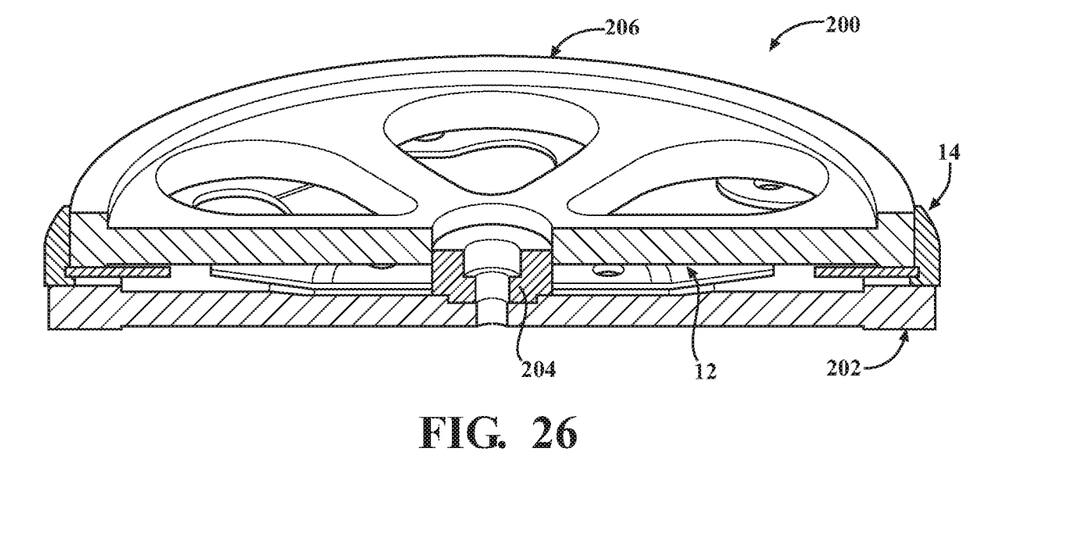
FIG. 26 is a sectioned perspective view of a CD welding tooling unit for CD welding any of the two-piece flexplate assemblies of the present disclosure.

Referring now to FIG. 26, a tooling unit for a CD welding process capable of use with each of the various two-piece flexplate assemblies previously described is shown and identified by 200. A ring gear 14 is first loaded onto a first or lower support pad 202. A center pin 204 is provided at the center of first support pad 202 to assist in centering a central plate 12 installed thereon. Specifically, central plate 12 is lined up by its center hole via centering pin 204 and is rested on top of ring gear 14. As will be understood, a joining structure is established by engagement between ring gear 14 and central plate 12. A second or upper tool member, such as clamp 206, is specially designed based on the specific joining structure utilized, to ensure that the electric current discharged from the capacitor during the CD welding process travels through the intended weld locations on central plate 12. Clamp 206 acts as the top electrode and provides the required clamping pressure, while first support pad 202 acts as the bottom electrode.

Before the capacitor discharge weld cycle commences, clamp 206 is raised above installed flexplate assembly 10. Once the cycle is started, clamp 206 is lowered. As soon as clamp 206 contacts central plate 12, the stored energy in the capacitor is released while clamping pressure is maintained. Secondary impulses may be triggered after the primary pulse to reheat the weld area, thereby reducing the heat affect zone cooling rate to present crack formation. Thus, CD welding provides a single and feasible solution to the different process of welding nitrided central plates to ring gears to provide a two-piece flexplate assembly.

As noted, during the CD welding process, a high pressure electrical current travels through the weld area to melt the engaged materials while simultaneously a large clamping force is applied to join the molten materials. This combination of high pressure current and large clamping face acts to instantaneously drive the nitrogen gas, generated by decomposition of the nitrided layer, away from the weld zone. This can be seen from the exemplary weld zone 208 shown in FIG. 27, where the nitrogen gas has been forced out of the heat affect weld area and a solid non-porous weld 210 has been formed between nitride central plate 12 and ring gear 14. The weld zone 208 is shown to include areas where molten ring gear material 212 is joined with molten central plate material 214.

Figure 27:
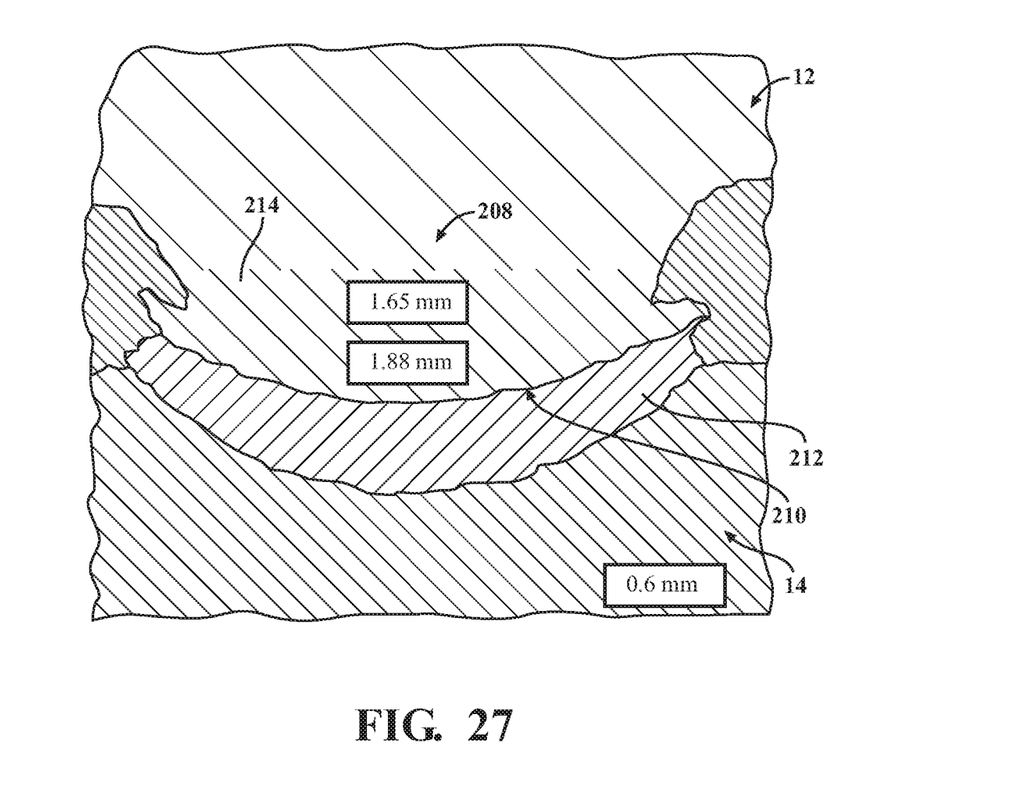
FIG. 27 illustrates a weld section generated by the CD welding process between the ring gear and the central plate of a two-piece flexplate assembly.

CD welding uses energy stored in a capacitor battery which is charged between sequential weld cycles. The actual welding time is relatively short, possibly only about 10 milliseconds. Because of this short welding time, the energy is concentrated to the weld zone 208 only. As the parts cool out rapidly, granulation is relatively fine since the short cooling phase leaves little time for grain growth. Steel materials containing carbon can be welded by reheat pulses which assist in reducing the hardness increase of the heat-affected zone. As noted, CD welding includes two primary parameters including welding energy and electrode force.

During welding, the discharged energy pulse causes the contacting portions of the components in the weld zone 208 to melt. The CD welding process allows extremely fast energy release with large peak currents. The heat-affected zone, where the properties of the metal have been changed by rapid heating and cooling, is localized to a small area around the weld spot.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a two-piece flexplate assembly comprising the steps of:
   providing a central plate having an outer peripheral portion, said central plate having a nitride layer formed at least on its outer peripheral portion;
   providing a ring gear having a rim portion;
   locating said outer peripheral portion of said central plate in engagement with a surface on said rim portion of said ring gear so as to establish a joining structure therebetween; and
   welding, said ring gear to said central plate along said joining structure using a capacitor discharge welding process for establishing a weld seam therebetween;
   wherein said joining structure is a projection joining structure between said ring gear and said central plate, wherein said rim portion of said ring gear defines a planar face surface, wherein said outer peripheral portion of said central plate defines a planar engagement surface having a plurality of projections extendedly outwardly therefrom and which are configured to engage said planar face surface on said rim portion of said ring gear, and wherein said weld seam formed by said capacitor discharge welding operation is a series of weld joints established between said projections and corresponding portions of the planar face surface of said ring gear; and
   wherein said planar face surface on said rim portion of said ring gear includes a series of detent chambers sized and arranged to receive and retain said projection extending from said central plate.

2. The method of claim 1 wherein said projections are equally-spaced and circumferentially-aligned on said outer peripheral portion of said central plate.

3. The method of claim 1 wherein said projections are formed in said central plate by a stamping process.

4. A method of manufacturing a two-piece flexplate assembly comprising the steps of:
   providing a central plate having an outer peripheral portion, said central plate having a nitride layer formed at least on its outer peripheral portion;
   providing a ring gear having a rim portion;
   locating said outer peripheral portion of said central plate in engagement with a surface on said rim portion of said ring gear so as to establish a joining structure therebetween; and welding, said ring gear to said central plate along said joining structure using a capacitor discharge welding process for establishing a weld seam therebetween;

wherein said joining structure is a projection joining structure between said ring gear and said central plate, wherein said rim portion of said ring gear defines a planar face surface, wherein said outer peripheral portion of said central plate defines a planar engagement surface having a plurality of projections extendedly outwardly therefrom and which are configured to engage said planar face surface on said rim portion of said ring gear, and wherein said weld seam formed by said capacitor discharge welding operation is a series of weld joints established between said projections and corresponding portions of the planar face surface of said ring gear; and wherein said planar face surface of said rim portion includes a detent groove sized and arranged to receive and retain said projections extending from said central plate thereon.

5. The method of claim 4 wherein said projections are equally-spaced and circumferentially-aligned on said outer peripheral portion of said central plate.

6. The method of claim 4 wherein said projections are formed in said central plate by a stamping process.

* * * * *